United States Patent [19]
Hara et al.

[11] 3,968,073
[45] July 6, 1976

[54] PROCESS FOR PRODUCING FIBER-GLASS REINFORCED PLASTICS

[75] Inventors: Junji Hara, Kamakura; Shigenori Togami, Yokohama; Masami Tsuruta, Odawara, all of Japan

[73] Assignee: Mitsui Toatsu Chemicals, Incorporated, Tokyo, Japan

[22] Filed: Sept. 4, 1973

[21] Appl. No.: 393,915

[30] Foreign Application Priority Data
Sept. 8, 1972   Japan .............................. 47-89575

[52] U.S. Cl. ........................ 260/42.18; 260/42.53; 264/128; 427/385; 428/290
[51] Int. Cl.² .......................................... C08K 7/14
[58] Field of Search ............... 260/42.18; 264/128; 427/385; 428/290

[56] References Cited
UNITED STATES PATENTS

| | | | |
|---|---|---|---|
| 2,311,613 | 2/1943 | Slayler | 260/42.18 |
| 3,347,818 | 10/1967 | Howe | 260/42.18 |
| 3,442,851 | 5/1969 | McManimie | 260/42.18 |
| 3,562,203 | 2/1971 | Grunin | 260/42.18 |

*Primary Examiner*—James H. Derrington
*Attorney, Agent, or Firm*—Fisher, Christen & Sabol

[57] ABSTRACT

A process for the production of glass-fiber reinforced plastics by partially copolymerizing a mixture of (A) 35–95% by weight methyl methacrylate, (B) 65–5% by weight of a vinyl aromatic hydrocarbon, and 0.2–5.0% by weight, based on the sum of (A) and (B) of a polymerizable compound containing two or more ethylenically unsaturated groups, discontinuing the partial copolymerization before gelation of said mixture has occurred, impregnating glass fibers with the resultant partially polymerized mixture and then curing the impregnated mixture.

9 Claims, No Drawings

PROCESS FOR PRODUCING FIBER-GLASS REINFORCED PLASTICS

BACKGROUND OF THE INVENTION

1. Field of the Invention

This invention relates to a process for the production of glass-fiber reinforced plastics and resins, and more particularly to such a process using methyl methacrylate and a vinyl aromatic hydrocarbon as the primary and preponderant starting materials.

2. Description of the Prior Art

Glass-fiber reinforced plastics prepared from a starting material consisting of polymethyl methacrylate have been known in the past and are desirable for outdoor use, particularly in sheet-like form. Such glass-fiber reinforced plastics are prepared by impregnating glass fibers with so-called "methyl methacrylate syrup" obtained, for example, through partial polymerization of methyl methacrylate in a reaction vessel or through dissolution of polymethyl methacrylate in methyl methacrylate in a container, and then curing the impregnated glass fibers. Prior art production processes of this nature, however, suffer from the disadvantages that glass-fiber reinforced plastics obtainable thereby are inferior in transparency and that strength reduction resulting from poor weatherability is undesirably high. With regard to the inferior transparency in particular, studies made by the present inventors have revealed that the same results from too great a difference in refractive index between the glass fiber and the methyl methacrylate polymer; the refractive index of the glass fiber is 1.51–1.55 while that of the methyl methacrylate polymer is approximately 1.49.

Such facts are important especially when the glass-fiber reinforced resin is to be used, for example, as a flat or corrugated sheet which desirably has as superior a transparency as possible, since, in such cases, poor transparency results in substantially lowering the commercial value of the product. From this standpoint, it would be naturally expected that since a polymer of a vinyl aromatic hydrocarbon such as styrene has a refractive index of from about 1.58 to 1.60, glass-fiber reinforced plastics of superior transparency would be obtainable if methyl methacrylate and a vinyl aromatic hydrocarbon were copolymerized in an appropriate proportion to prepare a syrup consisting of a copolymer having the same refractive index as that of the glass fiber, and the glass fiber were impregnated with said syrup.

Extensive studies made by the present inventors have revealed, however, that even an attempt to partially copolymerize methyl methacrylate and a vinyl aromatic hydrocarbon and then to impregnate glass fibers with the resultant syrup followed by curing results in excessive time consumed in the cure process, further resulting in extremely reduced producibility and rendering such a production process impractical from the standpoint of industrial scale practice. It has also been found that in such cases an attempt to shorten the cure time, for example by the use of large amounts of initiators, will result in the reduction of initial strength of the resultant glass-fiber reinforced plastic and that further subsequent strength reduction due to poor weather-resistance is undesirably high. This tendency manifests itself significantly through the effects of heat, moisture, ultraviolet rays and the like, thus rendering the production process impractical. The phenomenon described above that the use of syrup obtained by copolymerization of methyl methacrylate and a vinyl aromatic hydrocarbon should result in lengthening the cure time to such an extent that the production process is rendered impractical thereby becomes fully apparent with the use of as little as 5% by weight, based on the methyl methacrylate, of the vinyl aromatic hydrocarbon, and the use of larger amounts of the vinyl aromatic hydrocarbon does not affect the phenomenon far beyond that when using 5% by weight.

On the other hand, when such monomers as methyl acrylate, ethyl acrylate and acrylic acid, which when combined with methyl methacrylate do not retard the polymerization rate compared to that of methyl methacrylate alone, are used together with methyl methacrylate, production of the glass fiber reinforced plastic can be carried out without prolonging the cure time as is not the case when using methyl methacrylate alone. However, when employing this method, the refractive index of the copolymer derived from the monomeric combination cannot be equalized with that of the glass fiber, it thus being impossible to produce glass-fiber reinforced plastics of good transparency.

It is therefore a primary object of the present invention to provide a glass-fiber reinforced plastic production process of high industrial value whereby the above enumerated disadvantages with respect to cure time, transparency and strength involved in the use of a syrup obtained by copolymerization of a combination of methyl methacrylate and a vinyl aromatic hydrocarbon can be overcome and excellent glass-fiber reinforced plastics can be produced with high efficiency and producibility.

Additional objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The present invention provides a process for the production of glass-fiber reinforced plastics, which process comprises the steps of partially copolymerizing a mixture consisting essentially of (A) 35–95% by weight of methyl methacrylate, (B) 65–5% by weight of a vinyl aromatic hydrocarbon and (C) 0.2–5.0% by weight, based on the sum of said (A) and (B), of a polymerizable compound having two or more ethylenically unsaturated groups, discontinuing the partial copolymerization before gelation of said mixture has taken place, impregnating glass fibers with the resultant partially polymerized mixture and curing the impregnated mixture.

In accordance with the process of the present invention, it is now possible to produce glass-fiber reinforced plastics of excellent transparency and strength while satisfactorily shortening the necessary time for the cure to be effected subsequent to impregnation of the glass fiber with the partially polymerized mixture. In addition, the glass-fiber reinforced plastics obtained in accordance with the process of the present invention are greatly improved with respect to strength reduction due to poor weather-resistance of the prior art plastics.

The vinyl aromatic hydrocarbon which may be used in the present invention has a hydrocarbon structure wherein one vinyl group is directly bound to the aromatic ring, reprsentatives including styrene, vinyltoluene, vinylxylene, chlorostyrene, p-tert. butylstyrene, etc.

The compounds having two or more ethylenically unsaturated groups (hereinafter referred to as polyvinyl compounds) which may be used in the present invention are, representatively, acrylic-, methacrylic- or divinylbenzene- compounds such as ethyleneglycoldimethacrylate, diethyleneglycoldimethacrylate, trimethylolpropanetrimethyacrylate, ethyleneglycoldiacrylate and trimethylolethanetriacrylate, as well as divinylbenzene.

The methyl methacrylate and vinyl aromatic hydrocarbon are used in proportions of 35–95% by weight and 65–5% by weight, respectively. The proportion of the polyvinyl compound used is 0.2–5.0% by weight based on the sum of the methyl methacrylate and vinyl aromatic hydrocarbon. When the proportion of the methyl methacrylate used is below 35% by weight, that is, when the proportion of the vinyl aromatic hydrocarbon is above 65% by weight, it is not possible to produce glass-fiber reinforced plastics of satisfactory transparency and the products obtained thereby will undergo severe discoloration due to their poor weather-resistance, the use of such proportions thus being unsuitable for the purpose of the present invention. Also, when the proportion of methyl methacrylate used is above 95% by weight, that is, that of the vinyl aromatic hydrocarbon is below 5% by weight, it is not possible to produce glass-fiber reinforced plastics of satisfactory transparency and the products obtained thereby will undergo a significant reduction in strength due to poor weather-resistance, the use of such proportions thus being unsuitable for the purpose of the present invention. When the proportion of the polyvinyl compound used is below 0.2% by weight, the time required to effect curing after the glass-fiber-impregnation step of the invention will be excessively prolonged, thus resulting in reduced producibility and rendering the process impractical. In such cases, the use of large amounts of initiators in an attempt to shorten the cure time would give rise to a significant reduction in initial strength of the resultant glass-fiber reinforced plastic as well as to a significant strength reduction due to poor weather-resistance, the plastic thus losing practical value. As a consequence, the use of such proportions is not suitable for the purpose of the present invention. On the other hand, when the proportion of the polyvinyl compound used is above 5.0% by weight, the curing to be effected after the glass-fiber-impregnation step of the invention will cause sink phenomena (the phenomenon whereby the surface is partially sunk as well as the phenomenon whereby blowholes are formed in a portion of the interior) to occur, thus impairing the appearance and transparency of the final product, which product thus loses its commercial value. As a consequence the use of such proportions is unsuitable for the purpose of the invention.

In practicing partial copolymerization of the mixture of methyl methacrylate, vinyl aromatic hydrocarbon and polyvinyl compound in accordance with the present invention, normally an initiator is used or a heat polymerization procedure is adopted, it being preferred in either case to employ a molecular weight regulator. There may also be used, together with said methyl methacrylate, vinyl aromatic hydrocarbon and polyvinyl compound, any compound copolymerizable with said monomers, such as butyl methacrylate, hydroxyethyl acrylate or vinyl acetate, in such an amount as not to impair the advantages of the present invention, e.g., up to 30 % by weight and preferably from 0 to 15 % by weight of said monomers.

When a polymerization initiator is used in practicing said partial copolymerization, it is used in an amount of from 0.0005 to 1.0 parts by weight per 100 parts by weight of the mixture of monomers. Suitable initiators include benzoyl peroxide, lauroylperoxide, t-butylperpivapate, cyclohexanone peroxide and $\Delta,\Delta'$-azobisisobutyronitrile. When a heat polymerization procedure is adopted, the monomer mixture is heated to a temperature of from 70° to 150° C. Preferably, the partial polymerization is conducted in the presence of a gas inert to the reaction, e.g., nitrogen, although other inert gases may be used including Carbon dioxide, Argon, Helium, and . Optionally, both an initiator and a heat polymerization technique may be used. Suitable molecular weight regulators include t-dodecylmercaptan, n-dodecyl mercaptan, Thiophenol, Benzylmercaptan, and Thioglycolic acid, and the same may be used in an amount of from 0.01 to 2.0 parts by weight per 100 parts of the mixture of monomers.

The preferred degree of partial copolymerization of the mixture according to the present invention is in general 5–50% by weight based on the sum of the methyl methacrylate, vinyl aromatic hydrocarbon and polyvinyl compound comprising said mixture. In the present invention, in order to discontinue the partial copolymerization of the mixture of the methyl methacrylate, vinyl aromatic hydrocarbon and polyvinyl compound after it has proceeded to an extent whereby the mixture does not undergo gelation, cooling or addition of a polymerization inhibit is normally employed. For example, the partially copolymerized mixture may be cooled to a temperature below 50°C., preferably to a temperature between 10° and 30°C. Suitable polymerization inhibitors include hydroquinone, quinone, p-benzoquinone, 2,6-di-t-butyl-p-cresol, and p-t-butylcatechol and may be used in amounts of from 0.001 to 0.05 parts by weight per 100 parts of the partially polymerized mixture.

Furthermore, should the copolymerization reaction of said mixture proceed until the mixture gels, the partially polymerized mixture obtained thereby is of high viscosity, it thus being practically difficult to impregnate the glass fibers therewith. Also, such a high viscosity partially polymerized mixture is of inadequate wettability with regard to the glass fibers, thus necessarily resulting in involvement of air bubbles, which in turn gives rise to deterioration in the appearance and strength of the resulting glass-fiber reinforced plastics. In view of this, it is necessary in the present invention to stop the copolymerization reaction of the mixture prior to a point where gelation of said mixture occurs and to impregate the glass fibers with the resulting partially polymerized solution.

In effecting cure after impregnation of the glass fibers with the partially polymerized mixture, any suitable curing means (other than when curing is effected only through thermal polymerization) may be used with the use of polymerization initiators such as azo compounds or peroxides, photosensitizers plus ultraviolet rays, or radiation being preferred. When the polymerization initiators are used, the amounts thereof are normally 0.1–3 parts by weight per 100 parts of said partially polymerized mixture.

The reaction temperatures for the curing step are normally in the range of from room temperature to 120°C. The glass-fiber reinforced plastics produced in accordance with the present invention can be shaped into any form including flat sheets, corrugated sheets and tanks by performing molding in such a mold as to give the desired form after curing.

In practicing the process according to the present invention, for example, in a mixture of methyl methacrylate, vinyl aromatic hydrocarbon and polyvinyl compound there may be dissolved previously prepared polymers such as a methyl methacrylatestyrene copolymer in such amounts, e.g., up to 50 %, preferably from 0 to 30 % by weight of said mixture, as not to give any detrimental affect to the advantageous results according to the present invention. In the alternative, there may be added to the partially polymerized mixture obtained by discontinuing the copolymerization in accordance with the present invention polymers such as methyl-methacrylate-styrene copolymer, or methyl methacrylate, vinyl aromatic hydrocarbons or polyvinyl aromatic hydrocarbons, polyvinyl compounds or other copolymerizable monomers in small amounts, e.g., up to 30 %, preferably from 0 to 20 % by weight of said partially polymerized mixture as not to detrimentally affect the purpose and advantageous results according to the present invention.

As previously stated, in the present invention a mixture of methyl methacrylte, vinyl aromatic hydrocarbon and polyvinyl compound is partially polymerized and glass fibers are impregnated with the resulting partially polymerized mixture which is then cured. When not employing such a process, e.g., when a mixture of methyl methacrylate and vinyl aromatic hydrocarbon with no polyvinyl compound added is partially copolymerized, the partially polymerized mixture obtained by stopping the copolymerization reaction in a manner such that said mixture may not undergo so-called gelation is charged with a polyvinyl compound and the resulting mixture (that is, the mixture not containing polymeric polyvinyl compound) is used to impregnate glass-fibers and then cured, the cure time will be long and the strength, both at the completion of production (initial strength) and that with regard to weather-resistance, of the resulting glass-fiber reinforced plastic will be poor, such processes thus being impractical and unsuitable for the purpose of the present invention.

In impregnating glass-fibers with the partially polymerized mixture in accordance with the present invention, it is also possible to add any suitable colorants, U.V.-absorbers or fillers to the mixture and then impregnate the glass fibers therewith.

EXAMPLES 1–8

Eight experiments as indicated in Table 1 were performed using the following general procedure.

A liquid monomeric mixture consisting of methyl methacrylate, styrene and trimethylolpropanetrimethacrylate (hereinafter referred to as TMPT) in varied quantitative proportions as indicated in Table 1, 0.3 part by weight of n-dodecylmercaptan as molecular weight regulator and 0.05 part by weight of azobisisobutyronitrile as polymerization initiator were charged into a reaction vessel equipped with a reflux condenser and a stirrer. The air in the reaction vessel was replaced by nitrogen and the contents in the vessel were heated under the nitrogen atmosphere to 100°C., which temperature was maintained over the varied polymerization times indicated in Table 1 to conduct partial polymerization until the degrees of polymerization given in Table 1 were reached, thus providing a partially polymerized mixture. The resulting partially polymerized mixture was transparent and contained no insoluble gels.

Subsequently, benzoyl peroxide as curing catalyst in the amounts indicated in Table 1 was mixed with and dissolved in the partially polymerized mixture in the amounts indicated in Table 1. The resulting liquid mixture was then deoxidized and poured into a polymerization mold adapted fo flat sheet formation which mold had been uniformly filled with glass fibers (2 inch chopped strands, refractive index 1.52) in the amounts as indicated in Table 1, thus impregnating said glass-fibers therewith. Thereafter, the polymerization mold was held in an air oven maintained.at 75°C. over varied cure times as indicated in Table 1 to completely cure the impregnated mixture and then cooled to room temperature to remove therefrom a glass-fiber reinforced plastic sheet having a thickness of 1 mm. The resulting glass-fiber reinforced plastic sheet was subjected to measurements of transparency, sink marks, flexural strength before and after an accelerated weathering test, and hue before and after said accelerating weathering test, using the following respective methods, the results of which measurements are shown also in Table 1. The sink marks, as well as the hue before and after the accelerated weathering test, were evaluated on the basis of visual measurement. The transparency was evaluated by measuring % transmittance of visible rays having a wave-length of 700 m$\mu$. The flexural strength before and after the accelerated weathering test was determined in accordance with ASTM-D-790. The above-described accelerated weathering test used for the hue and flexural strength evaluations was performed by 400 hours exposure in accordance with "Standard Method for Dew-cycle Accelerated Weatherometer Testing" (see National Coil Coaters Association Technical Bulletin No. III-7, May, 1970), using a standard sunshine weather meter (manufactured by Toyo Rika Co., Ltd., Japan).

Table 1

| | Example Nos. Comparative examples | | | | | Examples of this invention | | Comparative example |
|---|---|---|---|---|---|---|---|---|
| | 1 | 2 | 3 | 4 | 5 | 6 | 7 | 8 |
| Methyl methacrylate (parts by weight) | 100 | 80 | 80 | 80 | 80 | 80 | 80 | 25 |
| Styrene (parts by weight) | 0 | 20 | 20 | 20 | 20 | 20 | 20 | 75 |
| TMPT (parts by weight) | 0 | 0.1 | 0.1 | 6.0 | 1.0 | 2.5 | 4.0 | 1.0 |
| Polymerization time (hours) | 4 | 8 | 8 | 3 | 8 | 8 | 3 | 10 |
| Degree of polymerization (% by weight) Partially polymerized solution | 30 | 30 | 30 | 12 | 30 | 30 | 12 | 30 |

Table 1-continued

|  | Example Nos. Comparative examples | | | | | Examples of this invention | | Comparative example |
| --- | --- | --- | --- | --- | --- | --- | --- | --- |
|  | 1 | 2 | 3 | 4 | 5 | 6 | 7 | 8 |
| (parts by weight) | 100 | 100 | 100 | 100 | 100 | 100 | 100 | 100 |
| Benzoyl peroxide (parts by weight) | 0.5 | 0.5 | 2.0 | 0.5 | 0.5 | 0.5 | 0.5 | 0.5 |
| Glass fiber (parts by weight) | 20 | 20 | 20 | 20 | 20 | 20 | 20 | 20 |
| Cure time (minutes) | 50 | 150 | 75 | 37 | 36 | 35 | 40 | 200 |
| Transparency (%) | 20 | 80 | 76 | 56 | 85 | 82 | 84 | 15 |
| Sink mark | No | No | No | Significant | No | No | No | No |
| Flexural strength (Kg/cm²) | | | | | | | | |
| Before accelerated weathering test | 1400 | 1380 | 1200 | 1440 | 1590 | 1650 | 1600 | 1350 |
| After accelerated weathering test | 730 | 990 | 850 | 1120 | 1350 | 1400 | 1400 | 1080 |
| % Reduction of flexural strength* | 47.8 | 27.5 | 29.1 | 22.2 | 15.1 | 15.1 | 12.5 | 20.0 |
| Hue after accelerated weathering test | Good | Good | Good | Good | Good | Good | Good | yellowed |

*% Reduction of flexural strength = $\dfrac{\text{Value before accelerated weathering test} - \text{Value after accelerated weather test}}{\text{Value before accelerated weathering test}} \times 100$

EXAMPLES 9-12

Four experiments as indicated in Table 2 were performed using the following general procedure.

A liquid monomeric mixture consisting of methyl methacrylate, vinyltoluene and ethyleneglycoldiacrylate (hereinafter referred to as EGDA) in varied quantitative proportions as indicated in Table 2, 0.3 part by weight of n-dodecylmercaptan as molecular weight regulator and 0.05 part by weight of azobisisobutyronitrile as polymerization initiator were charged into a reaction vessel equipped with a reflux condenser and a stirrer, the air in the reaction vessel was replaced by nitrogen and the contents in the vessel heated under the nitrogen atmosphere to 110°C., which temperature was maintained over varied polymerization. The contents were then cooled to room temperature to stop the polymerization reaction at a point whereby the degrees of polymerization as given in Table 2 were reached, thus providing a partially polymerized mixture. The resulting partially polymerized mixture was transparent and had no insoluble gel content.

Subsequently, benzoyl peroxide as a curing catalyst in the amounts indicated in Table 2 was mixed with and dissolved in the partially polymerized solution in the amounts indicated in Table 2. The resulting liquid mixture was then deoxidized and poured into a polymerization mold adapted for flat sheet formation which mold had been uniformly filled with glass fibers (2 inch chopped strands, refractive index 1.54) in the amounts indicated in Table 2, thus impregnating said glass fibers therewith. Thereafter, the polymerization mold was held in an air oven maintained at 75°C. over varied cure times as indicated in Table 2 to completely cure the impregnated mixture. The glass-fiber reinforced plastic sheet having a thickness of 1 mm obtained in the manner described in Examples 1-8 was subjected to measurements of transparency, sink marks, flexural strength before and after an accelerated weathering test, and hue before and after the accelerated weathering test, using the same methods as used in Examples 1-8, the results of which measurements are also shown in Table 2.

Table 2

|  | Example Nos. | | | |
| --- | --- | --- | --- | --- |
|  | Comparative examples | | Examples of this Invention | |
|  | 9 | 10 | 11 | 12 |
| Methyl methacrylate (parts by Weight) | 50 | 50 | 50 | 50 |
| Vinyl toluene (parts by weight) | 50 | 50 | 50 | 50 |
| EGDA (parts by weight) | 0.1 | 5.7 | 1.5 | 3.0 |
| Polymerization time (hours) | 8.5 | 3.5 | 8.5 | 3.5 |
| Degree of polymerization (% by weight) | 35 | 15 | 5 | 15 |
| Partially polymerized solution (parts by weight) | 100 | 100 | 100 | 100 |
| Benzoyl peroxide (parts by weight) | 1.0 | 1.0 | 1.0 | 1.0 |
| Glass fiber (parts by weight) | 20 | 20 | 20 | 20 |
| Cure time (minutes) | 142 | 34 | 33 | 37 |
| Transparency (%) | 80 | 59 | 86 | 81 |
| Sink mark | No | Significant | No | No |
| Flexural strength (Kg/cm²) | | | | |
| Before accelerated weathering test | 1340 | 1450 | 1610 | 1580 |
| After accelerated weathering test | 1050 | 1150 | 1300 | 1300 |
| % Reduction of flexural strength* | 21.6 | 26.0 | 19.2 | 17.8 |
| Hue after accelerated weathering test | Good | Good | Good | Good |

*The values for % reduction of flexural strength were calculated in accordance with the equation indicated in the footnote for Table 1.

EXAMPLES 13-17

Five experiments as indicated in Table 3 below were performed using the following general procedure.

A liquid monomeric mixture consisting of methyl methacrylate, styrene and ethyleneglycoldimethacrylate (hereinafter referred to as DEGDM) in varied quantitative proportions as indicated in Table 3, 0.3 part by weight of n-dodecylmercaptan as molecular weight regulator and 0.05 part by weight of azobisisobutyronitrile as polymerization initiator were charged into a reaction vessel equipped with a reflux condenser and a stirrer, the air in the reaction vessel was replaced by nitrogen and the contents of the vessel heated under the nitrogen atomsphere to 110°C., which temperature was maintained over varied polymerization times as given in Table 3 to conduct partial polymerization. The contents were then cooled to room temperature to stop the polymerization reaction at a point whereby the degrees of polymerization as indicated in Table 3 were reached, thus providing a partially polymerized mixture. The resulting partially polymerized mixture was transparent and had no insoluble gel content.

Subsequently, benzoyl peroxide as curing catalyst in the amounts as indicated in Table 3 was mixed with and dissolved in the partially polymerized solution in the amounts as indicated in Table 3. The resulting liquid mixture was then deoxidized and poured into a polymerization mold adapted for flat sheet formation which mold had been uniformly filled with glass fibers (2 inch chopped strands, refractive index 1.55) in the amounts indicated in Table 3, thus impregnating said glass fibers therewith. Thereafter the polymerization mold was held in an air oven maintained at 75°C. over varied cure times as indicated in Table 3 to completely cure the impregnated mixture. The glass-fiber reinforced plastic sheet having a thickness of 1 mm obtained in this manner similar to that described in Examples 1–8 was subjected to measurements of transparency, sink marks, flexural strength before and after an accelerated weathering test, and hue before and after the accelerated weathering test, using the same methods as used in Examples 1–8, the results of which are also shown in Table 3.

as indicated in Table 4, 0.3 part by weight of n-dodecylmercaptan as molecular weight regulator and 0.05 part by weight of azobisisobutyronitrile as polymerization initiator were charged into a reaction vessel equipped with a reflux condenser and a stirrer, the air in the reaction vessel was replaced by nitrogen and the contents in the vessel heated under the nitrogen atmosphere to 110°C., which temperature was maintained over varied polymerization times as given in Table 4 to conduct partial polymerizations. The contents were then cooled to room temperature to stop the polymerization reaction at a point whereby the degrees of polymerization as indicated in Table 4 were reached, thus providing a partially polymerized mixture. The resulting partially polymerized mixture was transparent and had no insoluble gel content.

Subsequently, benzoyl peroxide as curing catalyst in the amounts as indicated in Table 4 was mixed with and dissolved in the partially polymerized solution in the amounts as indicated in Table 4. The resulting liquid mixture was then deoxidized and poured into a polymerization mold adapted for flat sheet formation which mold had been filled with glass fibers (2 inch chopped strands, refractive index 1.54) in the amounts indicated in Table 4, thus impregnating said glass fibers therewith. Thereafter, the polymerization mold was held in an air oven maintained at 75°C. over varied cure times as indicated in Table 4 to completely cure the impregnated mixture. The glass-fiber reinforced plastic sheet Table 3

|  | Comparative examples | | Example Nos. Examples of this invention | | Comparative example |
|---|---|---|---|---|---|
|  | 13 | 14 | 15 | 16 | 17 |
| Methyl methacrylate (parts by weight) | 44 | 44 | 44 | 44 | 44 |
| Styrene (parts by weight) | 56 | 56 | 56 | 56 | 56 |
| DEGDM (parts by weight) | 0.07 | 5.5 | 2.0 | 3.5 | 0 |
| Polymerization time (hours) | 8.5 | 3.5 | 8.5 | 3.5 | 9.0 |
| Degree of polymerization (% by weight) | 30 | 10 | 30 | 10 | 30 |
| Partially polymerized solution (parts by weight) | 100 | 100 | 100 | 100 | 100 |
| DEGDM (parts by weight) | 0 | 0 | 0 | 0 | 2.0 |
| Benzoyl peroxide (parts by weight) | 1.0 | 1.0 | 1.0 | 1.0 | 1.0 |
| Glass fiber (parts by weight) | 20 | 20 | 20 | 20 | 20 |
| Cure time (minutes) | 220 | 37 | 39 | 37 | 60 |
| Transparency (%) | 83 | 70 | 85 | 82 | 82 |
| Sink mark | No | Significant | No | No | No |
| Flexural strength (Kg/cm²) |  |  |  |  |  |
| Before accelerated weathering test | 1400 | 1480 | 1550 | 1600 | 1380 |
| After accelerated weathering test | 1120 | 1130 | 1270 | 1360 | 1040 |
| % Reduction of flexural strength | 20.2 | 23.6 | 18.1 | 15.2 | 25.0 |
| Hue after accelerated weathering test | Good | Good | Good | Good | Good |

*The values for % reduction of flexural strength were calculated in accordance with the equation indicated in the footnote for Table 1.

EXAMPLES 18–21

Four experiments as indicated in Table 4 below were performed using the following general procedures.

A liquid monomeric mixture consisting of methyl methacrylate, styrene and divinylbenzene (hereinafter referred to as DVB) in varied quantitative proportions obtained in this manner similar to that described in Examples 1–8 was subjected to measurements of transparency, sink marks, flexural strength before and after an accelerated weathering test and hue before and after the accelerated weathering test, using the same methods as used in Examples 1–8, the results of which are also shown in Table 4.

Table 4

|  | Comparative examples | | Example Nos. Examples of this Invention | |
|---|---|---|---|---|
|  | 18 | 19 | 20 | 21 |
| Methyl methacrylate (parts by weight) | 50 | 50 | 50 | 50 |
| Styrene (parts by weight) | 50 | 50 | 50 | 50 |
| DVB (parts by weight) | 0.05 | 5.5 | 1 | 2.5 |
| Polymerization time (hours) | 8.0 | 3.0 | 8.0 | 3.0 |
| Degree of polymerization (% by weight) | 34 | 12 | 34 | 12 |
| Partially polymerized solution |  |  |  |  |

Table 4-continued

| | Comparative examples | | Examples of this Invention | |
|---|---|---|---|---|
| Example Nos. | 18 | 19 | 20 | 21 |
| (parts by weight) | 100 | 100 | 100 | 100 |
| Benzoyl peroxide (parts by weight) | 1.0 | 1.0 | 1.0 | 1.0 |
| Glass fiber (parts by weight) | 15 | 15 | 15 | 15 |
| Cure time (minutes) | 180 | 32 | 34 | 32 |
| Transparency (%) | 85 | 75 | 90 | 92 |
| Sink mark | No | Significant | No | No. |
| Flexural strength (kg/cm$^2$) | | | | |
| Before accelerated weathering test | 1300 | 1440 | 1520 | 1580 |
| After accelerated weathering test | 1000 | 1050 | 1260 | 1340 |
| % Reduction of flexural strength* | 23.0 | 27.2 | 17.1 | 15.2 |
| Hue after accelerated weathering test | Good | Good | Good | Good |

*The values for % reduction of flexural strength were calculated in accordance with the equation indicated in the footnote for Table 1.

What is claimed is:

1. A process for the production of glass-fiber reinforced plastics, which process comprises the steps of partially copolymerizing a mixture consisting essentially of (A) 35–95% by weight methyl methacrylate, (B) 65–5% by weight of a vinyl aromatic hydrocarbon and (C) 0.2–5.0% by weight, based on the sum of said (A) and (B), of a polymerizable compound containing two or more ethylenically unsaturated groups, discontinuing the partial copolymerization before gelation of said mixture has taken place, impregnating glass fibers with the resultant partially polymerized mixture and curing the impregnated mixture.

2. The process according to claim 1 wherein said vinyl aromatic hydrocarbon has a hydrocarbon structure wherein one vinyl group is directly bound to the aromatic ring.

3. The process according to claim 1 wherein said polymerizable compound containing two or more ethylenically unsaturated groups is an acrylic, methacrylic or divinylbenzene compound.

4. The process according to claim 1 wherein a polymerization initiator is added to said mixture of (A), (B) and (C).

5. The process according to claim 1 wherein the degree of partial polymerization is from 5 to 50% by weight based on the sum of said (A), (B) and (C).

6. The process according to claim 1 wherein a polymerization inhibitor is added to said partially polymerized mixture to discontinue said partial copolymerization.

7. The process according to claim 1 wherein the final cure is conducted in the presence of a polymerization initiator as a curing agent.

8. The process according to claim 1 wherein the final cure is conducted at a temperature of from room temperature to 120°C.

9. A glass-fiber reinforced plastic produced according to the process of claim 1.

* * * * *